United States Patent
Ray et al.

(10) Patent No.: US 10,809,673 B2
(45) Date of Patent: Oct. 20, 2020

(54) WASH RELATED TO CONTAMINANT EXPOSURE TIME

(71) Applicant: INTERNATIONAL BUSINESS MACHINES CORPORATION, Armonk, NY (US)

(72) Inventors: Shubhadip Ray, Secaucus, NY (US); Norbert Herman, Denver, CO (US); Gregory J. Boss, Saginaw, MI (US); Siddique M. Adoni, Bangalore (IN); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/182,984

(22) Filed: Nov. 7, 2018

(65) Prior Publication Data

US 2020/0142363 A1 May 7, 2020

(51) Int. Cl.
*G05B 13/02* (2006.01)
*B60S 3/04* (2006.01)

(52) U.S. Cl.
CPC ............. *G05B 13/0285* (2013.01); *B60S 3/04* (2013.01)

(58) Field of Classification Search
CPC .............................. G05B 13/0285; B60S 3/04
See application file for complete search history.

(56) References Cited

U.S. PATENT DOCUMENTS

| | | | |
|---|---|---|---|
| 3,459,203 A | 8/1969 | Pritchard | |
| 3,533,422 A | 10/1970 | Alimanestiano | |
| 5,076,304 A * | 12/1991 | Mathews | B60S 3/04 134/123 |
| 5,886,648 A | 3/1999 | McElroy | |
| 6,095,438 A * | 8/2000 | Fratello | B60S 3/04 118/314 |
| 6,277,207 B1 * | 8/2001 | Gauthier | B60S 3/002 134/123 |

(Continued)

FOREIGN PATENT DOCUMENTS

WO 2017129592 A1 8/2017

OTHER PUBLICATIONS

Chau-Chang Wang, Laser Scanning Theory and Applications, Apr. 26, 2011, www.intechopen.com/books/laser-scanning-theory-and-applications, entire document.

(Continued)

*Primary Examiner* — Christopher E. Everett
(74) *Attorney, Agent, or Firm* — Patrick J. Daugherty; Daugherty & Del Zoppo Co., LPA (57) ABSTRACT

Embodiments determine historical geographic travel data of a vehicle over a contaminant exposure time period that is inclusive of a present time; identify a contaminant that is likely located on an external surface of the vehicle as a function of historic meteorological and terrain data of the historical geographic travel data of a vehicle over a contaminant exposure time period; select a cleaning solution that is appropriate for use in cleaning the identified contaminant from the external surface of the vehicle; and drive a vehicle wash system nozzle to use the selected cleaning solution to wash the identified contaminant from the external surface of the vehicle.

20 Claims, 5 Drawing Sheets

(56) References Cited

U.S. PATENT DOCUMENTS

| | | | | |
|---|---|---|---|---|
| 6,394,370 | B1* | 5/2002 | Payne | B60S 3/04 134/123 |
| 6,735,884 | B2* | 5/2004 | Fratello | B60S 3/002 239/751 |
| 6,842,997 | B1* | 1/2005 | Fratello | B60S 3/002 34/418 |
| 6,863,739 | B2* | 3/2005 | Fratello | B60S 3/04 134/113 |
| 7,045,021 | B2 | 5/2006 | Ewing et al. | |
| 8,273,184 | B2* | 9/2012 | Wagner | B08B 3/00 134/113 |
| 8,372,208 | B2* | 2/2013 | Gauthier | B60S 3/04 134/123 |
| 8,527,372 | B2 | 9/2013 | Sanville et al. | |
| 8,583,330 | B2* | 11/2013 | Furness | B60S 3/00 701/36 |
| 10,144,396 | B1* | 12/2018 | Krause | B60S 3/04 |
| 2002/0112312 | A1 | 8/2002 | Lin | |
| 2003/0233153 | A1* | 12/2003 | Grier | B60S 3/04 700/11 |
| 2004/0159342 | A1* | 8/2004 | Ewing | B08B 3/00 134/29 |
| 2004/0220817 | A1* | 11/2004 | Sanville | B60S 3/00 700/265 |
| 2007/0227558 | A1* | 10/2007 | Chase | B08B 3/024 134/18 |
| 2008/0229531 | A1 | 9/2008 | Takida | |
| 2010/0186778 | A1* | 7/2010 | Martin | B08B 3/024 134/34 |
| 2018/0281752 | A1* | 10/2018 | Detrick | B60S 3/06 |
| 2018/0345918 | A1* | 12/2018 | Foerg | B60S 3/06 |

OTHER PUBLICATIONS

Gerald F. Marshall, Handbook of Optical and Laser Scanning / Edition 2, www.perftest.barnesandnoble.com/w/handbook-of-optical-and-laser-scanning-gerald-f-marshall/1101589508, abstract.

Mell, et al., "The NIST Definition of Cloud Computing", National Institute of Standards and Technology, Sep. 2011, p. 1-3, Special Publication 800-145, entire document.

Rajiv Kohli, Developments in Surface Contamination and Cleaning, vol. 7, www.elsevier.com/books/developments-in-surface-contamination-and-cleaning-volume-7/kohli/978-0-323-31303-2, abstract.

Tomas Bezak, Surface Roughness Determination Using Laser Scanning Confocal Microscope ZEISS LSM 700, Metal 2013, May 17, 2013, Brno, Czech Republic, EU, entire document.

* cited by examiner

WASH RELATED TO CONTAMINANT EXPOSURE TIME

BACKGROUND

Vehicle washing systems are facilities used to clean exterior and interior areas of vehicles used to transport people, goods, and other tangible items. The term vehicle may refer to a wide variety of items, and illustrative but not limiting or exhaustive examples include automobiles (cars), airplanes, boats, motorcycles, bicycles, buses, train cars, satellite and extraterrestrial delivery rockets and vehicles, and dirigibles. Vehicle washes may be manual or self-serve operations wherein a user uses washing and rinsing apparatus to manually clean a vehicle; or they may be fully automated, or full-service with attendants who wash the vehicle.

Automated vehicle wash systems provide a variety of options, and may offer pre-configured combinations of washing, waxing, detailing and drying options for selection by a user, including in association with a given cost or price. The amount of extent of cleaning and surface detailing (waxing, buffing, protective coat applications, etc.) performed on a given vehicle may vary greatly, typically in correlation to a price point selection by a vehicle owner, who generally desires an optimal vehicle wash result achievable for the cost in price or time to the vehicle owner.

SUMMARY

In one aspect of the present invention, a computerized method includes executing steps on a computer processor. Thus, a computer processor is configured to determine historical geographic travel data of a vehicle over a contaminant exposure time period that is inclusive of a present time; identify a contaminant that is likely located on an external surface of the vehicle as a function of historic meteorological and terrain data of the historical geographic travel data of a vehicle over a contaminant exposure time period; select a cleaning solution that is appropriate for use in cleaning the identified contaminant from the external surface of the vehicle; and drive a vehicle wash system nozzle to use the selected cleaning solution to wash the identified contaminant from the external surface of the vehicle.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine historical geographic travel data of a vehicle over a contaminant exposure time period that is inclusive of a present time; identify a contaminant that is likely located on an external surface of the vehicle as a function of historic meteorological and terrain data of the historical geographic travel data of a vehicle over a contaminant exposure time period; select a cleaning solution that is appropriate for use in cleaning the identified contaminant from the external surface of the vehicle; and drive a vehicle wash system nozzle to use the selected cleaning solution to wash the identified contaminant from the external surface of the vehicle.

In another aspect, a computer program product for a contaminant washing apparatus has a computer-readable storage medium with computer readable program code embodied therewith. The computer readable program code includes instructions for execution which cause the processor to determine historical geographic travel data of a vehicle over a contaminant exposure time period that is inclusive of a present time; identify a contaminant that is likely located on an external surface of the vehicle as a function of historic meteorological and terrain data of the historical geographic travel data of a vehicle over a contaminant exposure time period; select a cleaning solution that is appropriate for use in cleaning the identified contaminant from the external surface of the vehicle; and drive a vehicle wash system nozzle to use the selected cleaning solution to wash the identified contaminant from the external surface of the vehicle.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
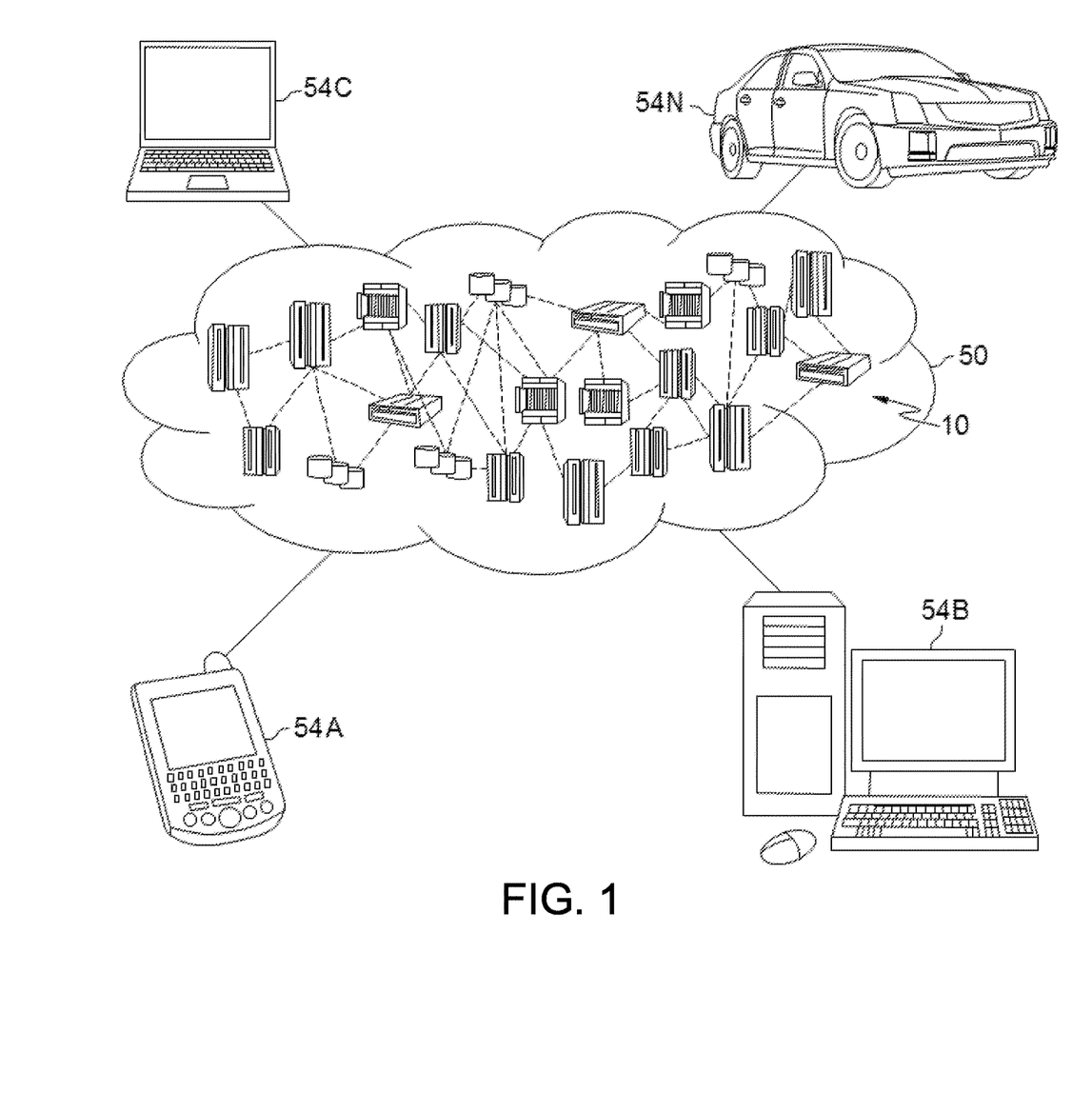
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
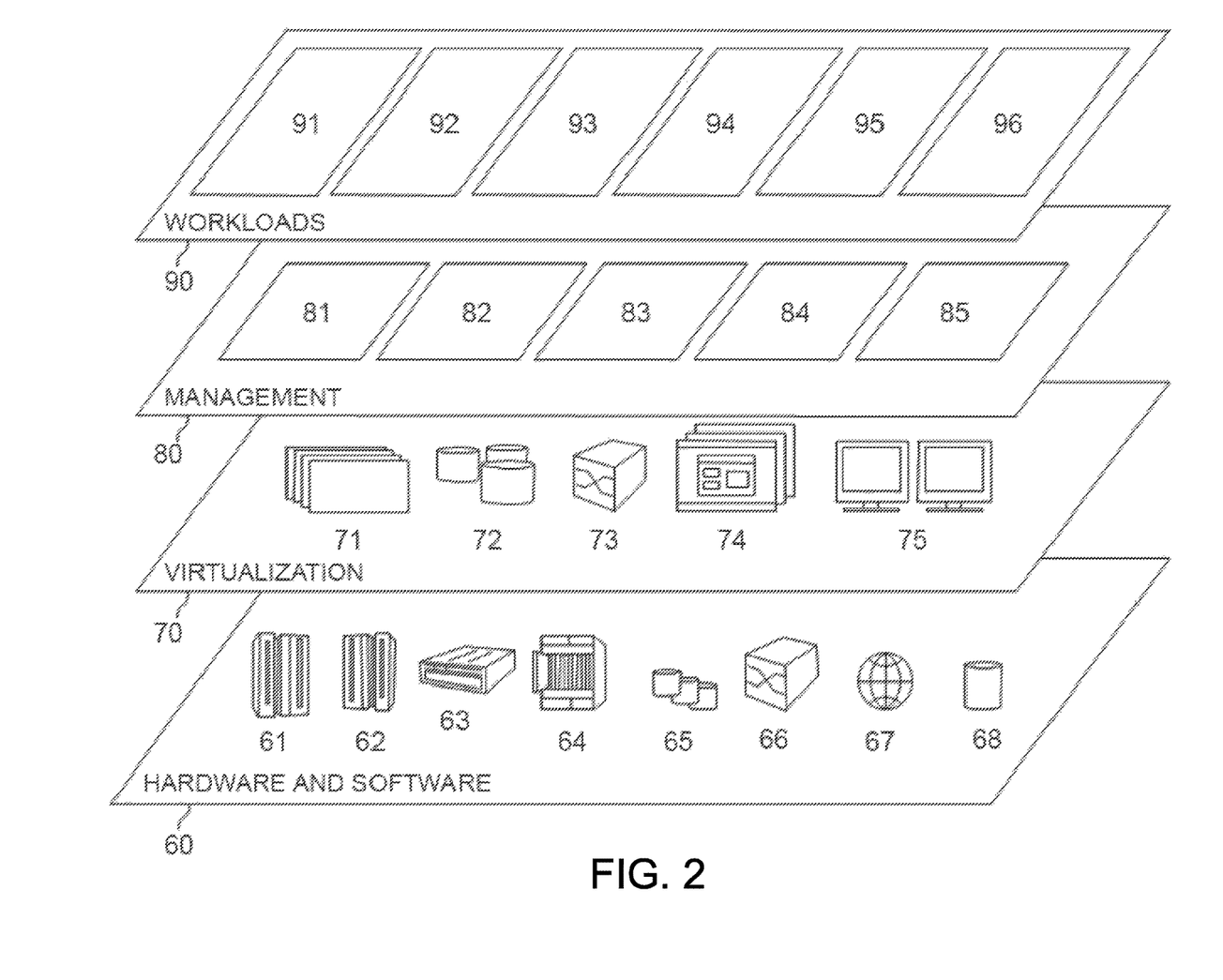
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a contaminant washing apparatus according to aspects of the present invention 96.

Figure 3:
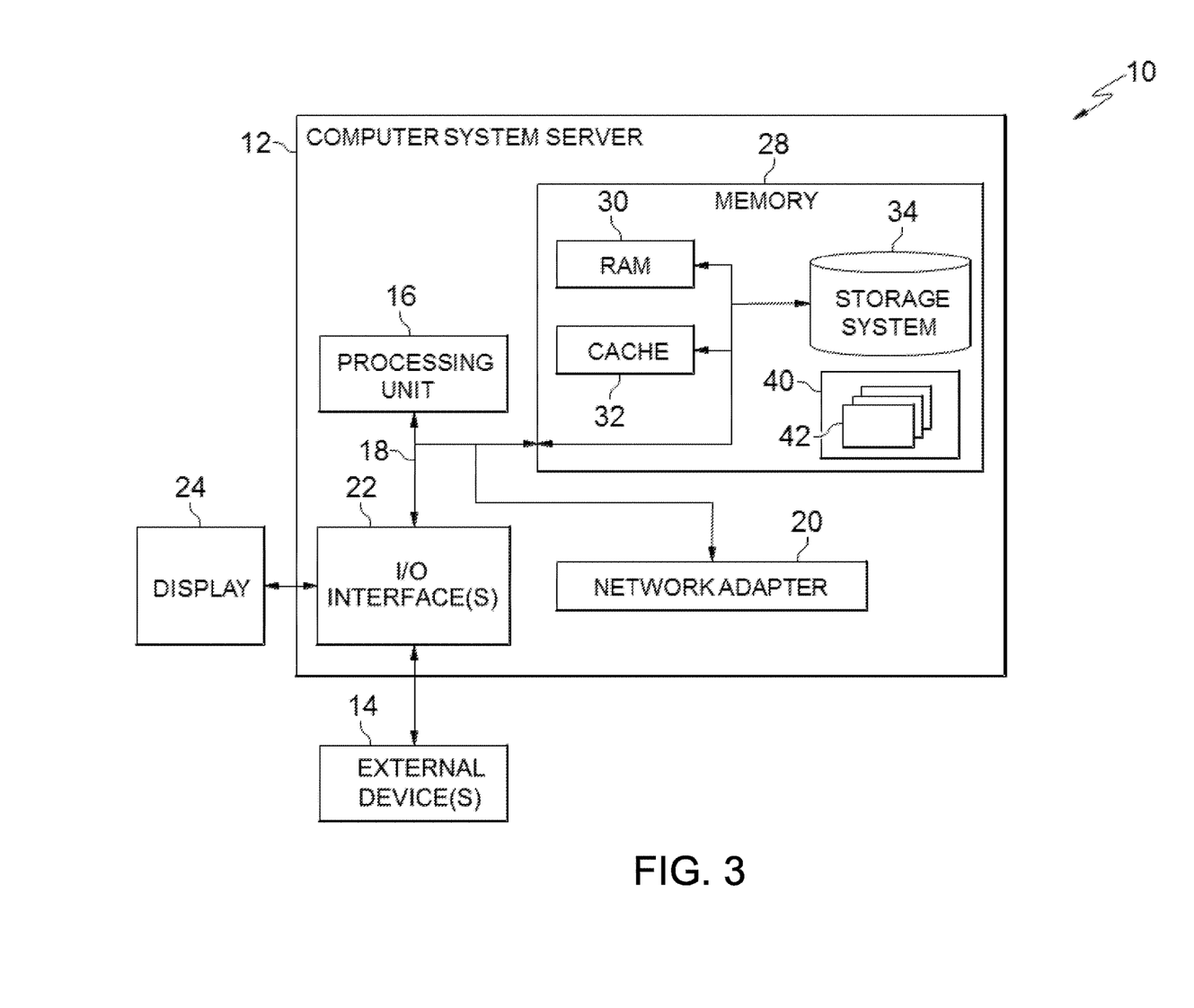
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

Figure 4:
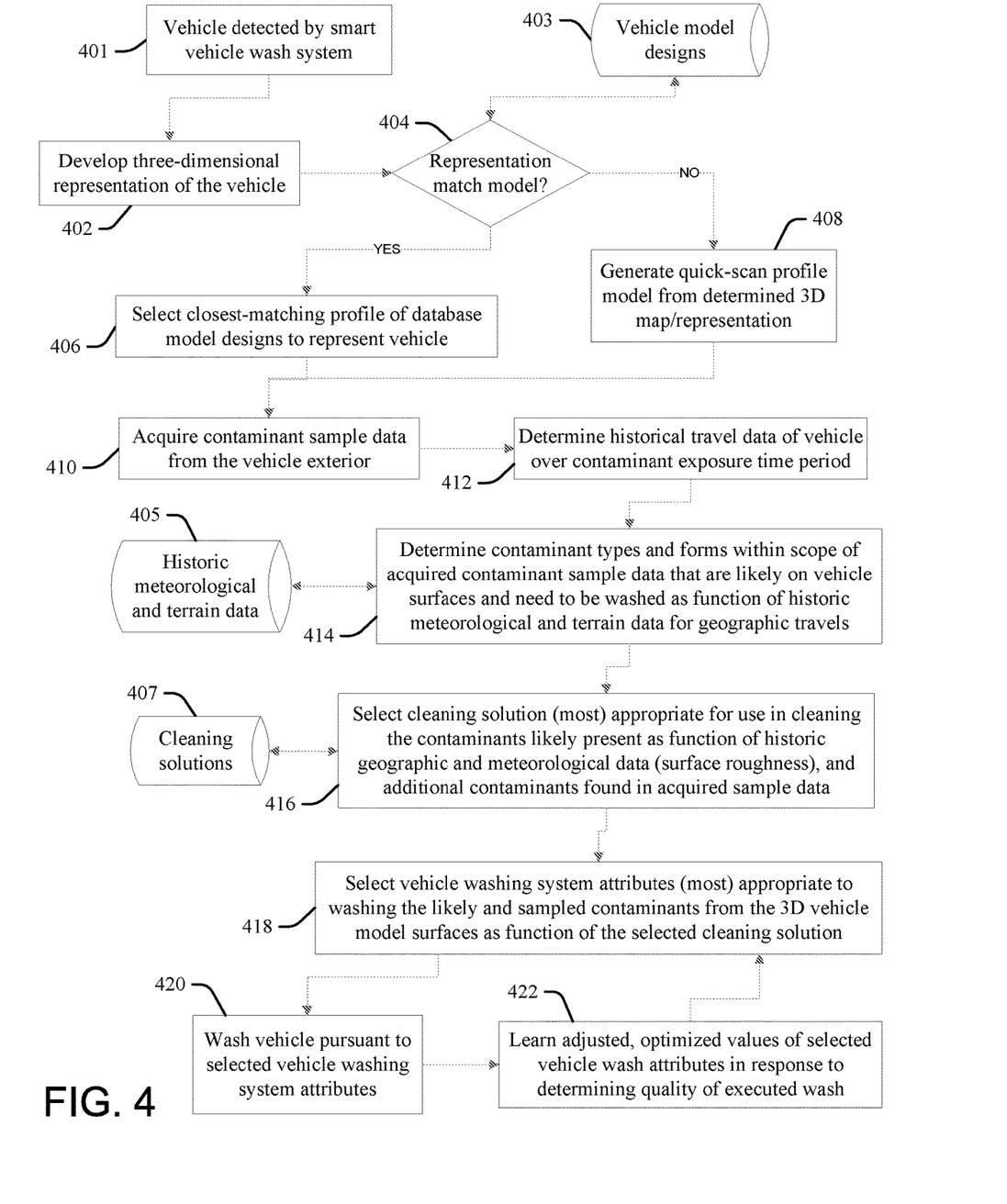
FIG. 4 is a flow chart illustration of an embodiment of the present invention.

FIG. 4 illustrates a system, process, or device according to an embodiment of the present invention. In FIG. 4, at 401, a processor that is configured according to the present invention (the "configured processor") to control a vehicle wash system detects the presence of a vehicle to be washed by the system.

At 402 the configured processor uses cameras, scanners and other sensor data to develop a three-dimensional (3D) representation or map of the vehicle. Illustrative but not exhaustive sensors include image or optical devices that use reflected light or laser signals to recognize vehicle shapes and surfaces and types, as well as audio or other wavelength sensors that use sound, ultrasound, radio waves, radar, sonar, etc., reflected wave signals to determine geographic locations of the vehicle surface.

At 404 the configured processor compares the 3D representation generated by the sensors at 402 to a database 403 of known vehicle model designs that are defined from manufacturer and other data inputs, to match the determined vehicle representation to one of the model profiles stored in the database 403 within a threshold level of precision.

In response to finding at least one match within the requisite threshold level of precision at 404, a closest-matching profile of the database model designs is selected to represent the vehicle at 406. Alternatively, if no matching profile is found within the threshold level of precision at 404, at 408 the configured processor generates a quick-scan profile model from the 3D map/representation determined at 402 to represent the vehicle.

Thus, the configured processor uses the matching profile, and/or the quick-scan profile, to recognize the location and dimensions of surface components (windows, trim, door panels, roof racks, etc.) of a matching profile. Unexpected or unusual features or modifications to the vehicle that do not match mapped structures within the vehicle profile data at 404 and may impact optimal nozzle path, for example, bicycle racks, spoilers, roof racks, rally lights and other external vehicle modifications, are recognized, mapped and accounted for, including via the quick-scan profile model process at 408.

At 410 the configured processor acquires contaminant sample data from the vehicle exterior. In one embodiment of the present invention, the configured processor utilizes sensors or collectors to analyze water run-off from a preliminary rinse and identify contaminants within the rinse from the vehicle surfaces. In another embodiment, the configured processor utilizes contact accumulators that physically touch the vehicle, including via robotic arms that move and adjust to the 3D profile map created at 408, or matched to a database profile at 406, as it enters the contaminant wash system with a cloth or other material that captures contaminant samples for analysis.

At 412 the configured processor determines or gathers historical geographic travel data of the vehicle to determine where the vehicle has been over a contaminant exposure time period that is inclusive of the present time (for example, over a period of time since a last wash by the system, or over the last day, 72 hours, week or some other time period). The location data may be acquired directly from vehicle on-board global positioning satellite (GPS) systems (for example, from data logs stored to memory devices within the on-board system), or from remote (including cloud-based) location-tracking systems or services that communicate with the vehicle (or with a smart-phone or other programmable device carried by the driver or occupant of the vehicle) and track movements of the vehicle or occupant (for example, a map application executing on a vehicle or occupant device, etc.).

At 414 the configured processor determines types and forms of contaminants within the scope of the contaminant sample data acquired at 410 that are likely on vehicle surfaces and need to be washed from the vehicle as a function of historic meteorological and terrain data 405 for the geographic travels determined over the contaminant exposure time period at 412.

Different weather conditions may lead to different sorts of contamination such as films, deposits, scales, and coatings. For example, in response to determining at 412 that the vehicle is an automobile that has recently been on an interstate highway shortly after a snow-storm, the configured processor determines that it is likely (greater than 50% chance, or 60% or some other threshold value) that the vehicle is covered with salt deposits that were used to treat the road surfaces during or prior to the time of travel (including as determined from historic road salt treatment times and amounts data provided by governmental entities). Such determinations may also differentially weight indications from analysis of contaminant sample data acquired at 410: for example, raising the weighting or likelihood of positive indication values of the presence of road salt within an analyzed sample, to bias toward determining the presence of road salt on external vehicle surfaces.

In another example, in response to determining at 412 that the vehicle is an automobile that has recently crossed a creek on an unimproved road in a historically arid location on a ninety-degree Fahrenheit day, the configured processor determines that it is (more) likely to have a film of a dry clay found in that creek bed at the GPS location (within the historic meteorological and terrain data 405) deposited around the vehicle model exterior wheel wells, as a function of determining that weather conditions have been dry over a preceding time period (for example, two days or less for low dew point and humidity conditions, or greater than two days for wet or humid climate conditions); or, that it is likely to have a thick, resilient and tenacious coating of dried mud on painted surfaces near the wheel wells (wherein a tenacious value indicates a relative amount of resilience and resistance to washing solutions and rinsing pressures in removing the contaminant from an external vehicle surface upon which it is deposited), as a function of determining that weather conditions were wet, or that the creek bed likely had flowing water due to recent rains. Thus, by combining historic location and weather data, the configured processor predicts the amounts, nature and adhesive characteristics of the contaminants that are likely found on the vehicle to be washed off by the contaminant wash system.

At 416 the configured processor selects, from a knowledge base of possible cleaning solutions 407, a cleaning solution that is (most) appropriate for use in cleaning the contaminants likely to be present as a function of the contaminant (dirt) presence and adhesion characteristic likelihoods determined from historic geographic travel and associated meteorological data at 414, and further with respect to other contaminants found in the sample data acquired at 410. Thus, contaminants not determined as likely present as a function of location and weather data at 416, but detected by the pre-wash contaminant sampling at 410, are added to a contaminant profile used for cleaning solution selection, and wherein the adhesion tenacity or deposit amounts may be estimated as a function of the historic geographic travel and associated meteorological data.

At 416 the configured processor selects a mix of detergents, soaps, waters, and other cleaning, polishing, and finishing agents from the database 407 which are most likely to effectively and efficiently clean the vehicle having surfaces and components of the size and type of the vehicle profile identified at 406 or modelled at 408, as a function of said identified and predicted contaminants, and their adhesion tenacity, deposit amounts, etc., as estimated (weighted) as a function of the historic geographic travel and associated meteorological data.

Some embodiments further estimate or determine and consider vehicle surface roughness at 416 (for example, paint quality, thickness or resiliency level of wax or other protective finishes, etc.) from surface finish data acquired at 402 or 410, and/or as determined by vehicle history (elapsed time from last protective coating treatment, age of paint and likely oxidation levels or degradation predicted from historic geographic travel and associated meteorological data, inclusive of sun exposure and strength, etc.).

At 418 the configured processor selects vehicle washing settings or attributes of components of the cash wash system (nozzle orientation and path and expelling pressure, water injector angles and distances and pressures, solution mix temperature, solution mix pressure, wash time values. vehicle conveyor speed, etc.) that are (most) appropriate to washing the likely and sampled contaminants (determined at 410 and 414) from the 3D vehicle model surfaces (matched at 406 or generated at 408) (and optionally responsive to adhesion state/tenacity and/or deposit amount values estimated (weighted) as a function of the historic geographic travel and associated meteorological data), as a function of the performance characteristics of the selected cleaning solution (selected at 416). (Vehicle conveyor speed refers to the speed that an automated conveyor system moves the vehicle past injectors, nozzles and other components of the vehicle wash system while the vehicle wash processes are executed.)

At 420 the configured processor executes washing of the vehicle pursuant to the vehicle washing attributes selected at 418.

At 422 the configured processor learns adjusted, optimized values of the selected vehicle wash system attribute values in response to determining a quality of executed wash, for use in subsequent optimal setting values at 416 for additional or future washes of the vehicle, to provide an optimally cleaned vehicle with minimal cost (water, energy, detergent, etc.) to the vehicle washing system or the user. Some embodiments use optical sensors or cameras to compare surface contamination data taken before the wash to data taken after the wash. The determined quality of the wash provides feedback to processes at 416 which learn over time how to build the optimal wash based on input data. Embodiments of the invention may utilize one or more algorithms to optimize the wash values at 422 that include, but are not limited to, efficiency in consumption of water and detergent, efficiency of total wash time, and cost efficiency of the wash, including as discussed further below.

Thus, aspects of the invention provide methods, devices, processes and systems for customizing a vehicle wash based on predicted contaminants and their adhesion tenacity, deposit amounts, etc., as estimated (weighted) as a function of an analysis of the types of terrain and weather that a vehicle has been exposed to over a contaminant exposure time period. Different vehicles exposed to different contaminants and weather conditions can be cleaned differently to maximize efficient use of water, cleaning solution, energy, and time, as a function of differences in their vehicle profile models (for example, differences in surface roughness, scratches, paint coating, external finish materials, etc.). Aspects process real-time data from built-in sensors, and historic, stored data associated with the vehicle to generate more (most) efficient vehicle wash processes relative to the prior art.

Figure 5:
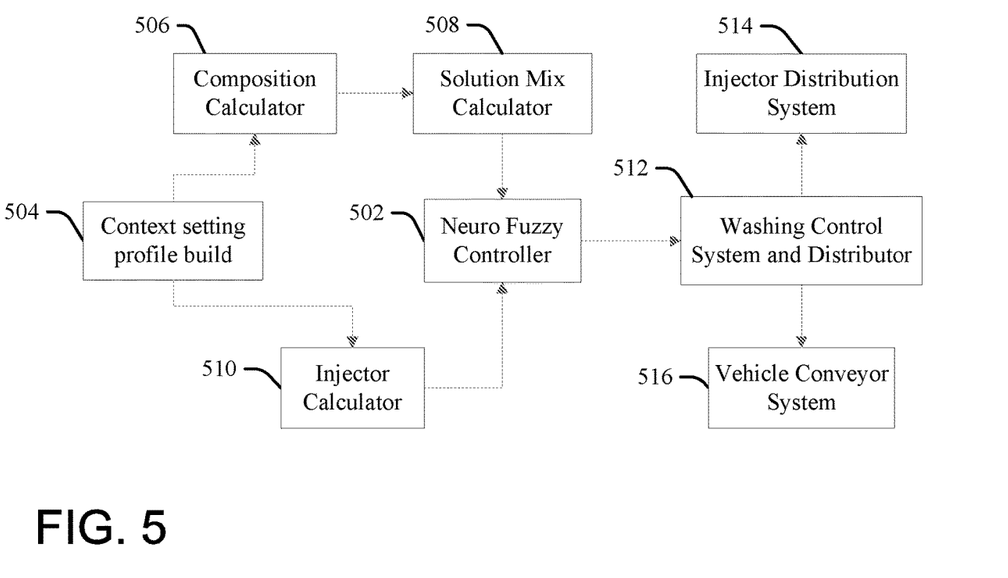
FIG. 5 is a block diagram illustration of an embodiment of the present invention.

FIG. 5 illustrates an embodiment of the present invention wherein a Context Setting Profile Build component 504 defines an exterior surface profile or representation of the vehicle to be washed, as a function of geometry data (shape, size, arrangement of accessories, etc.) from the vehicle profile data determined (at 402, FIG. 4) and matched to a known profile (at 406) or generated directly from the data (at 408).

A Composition Calculator 506 and a Solution Mix Calculator 508 select and execute mixes of detergent, soaps, waters, cleaning, polishing, and finishing agents, etc., (as described with respect to 416, FIG. 4) that are (more or most) likely to effectively and efficiently clean the vehicle surfaces and components of the size, type, external finish material, etc., identified by the Context Setting Profile Build component 504.

An Injector Calculator 510 (as described with respect to 418, FIG. 4) selects vehicle wash system nozzle attributes (orientation and path and expelling pressure, water injector angles and distances and pressures, solution mix temperature, solution mix pressure, etc.) that are (most) appropriate to washing the likely/sampled contaminants on the vehicle, A Neuro Fuzzy Controller component 502 processes data inputs from the Context Setting Profile Build component 504, Composition Calculator 506, Solution Mix Calculator 508 and Injector Calculator 510 and outputs values to a Washing Control System and Distributor 512 to operate an Injector Distribution System 514 to spray cleaning and rinsing solutions on the vehicle in pressures and amounts determined as a function of a speed that the vehicle is compelled through the vehicle wash system by a Vehicle Conveyor System 516. The Neuro Fuzzy Controller component 502 determines the appropriate vehicle wash component attribute values in response to vehicle dimensions, and levels and nature of contamination (dirt) observed or predicted on the vehicle, including as a function of surface characteristics of the vehicle.

Thus, the Neuro Fuzzy Controller component 502 uses the Context Setting Profile Build component 504 output to optimize injector and wash solution values, optimizing the use of washing solution, increasing the efficiency of operation for optimal cleaning, and preventing inadvertent nozzle damage to the vehicle, for example, selecting an injector nozzle direction angle relative to vehicle surfaces, and distance and pressure settings of nozzles, jets or injectors used to deploy cleaning and rinsing solutions (sometimes referred to generically as the "injector system") in response to outputs of other expert system components (the Composition Calculator 506 and the Solution Mix Calculator 508), which may use and maintain a database of relevant mechanical and geometric characteristics of vehicles. The Neuro Fuzzy Controller component 502 may use longitudinal and other profile data of the vehicle used to set automatic positioning of nozzles via the Washing Control System and Distributor 512.

In some embodiments, the Neuro Fuzzy Controller component 502 uses the following functional algorithms to optimize injector settings, vehicle conveyor system timing values, wash solution composition values and other vehicle wash system attribute values:

"I=f(A, W, C, D)" to define a position (angle and/or distance relative to a surface of the washed vehicle) of an injector "I";

"L=f(A, C, D)" to determine or define amounts or percentage values "L" of the chemical makeup or composition of the cleaning or rinsing solutions applied to the vehicle (for example, base or acid values, percentages of caustic chemicals, surfactants, wax, rust inhibitors etc.);

"T=f(L, C, D)" to define applied cleaning, rinsing solution or water temperatures "T";

"P=f(T, L, D)" to set washing pressure values "P" for cleaning solution, rinsing and other composition washing pressures as delivered by injectors and nozzles; and "t=f(I, L, C, D, P)" to define a time period "t" of washing the vehicle by the washing system (for example, travel time executed by a vehicle conveyor system, or times for injectors to discharge cleaning or rinsing solutions or water onto the vehicle);

wherein "G" is a geospatial location data value (for example, GPS location coordinate data telematics from the vehicle, or from an associated user smartphone, etc.);

"W" is a weather data value (for example, humidity, dew point, sun exposure amount and strength, rain amount exposure, wind velocity exposure, snow amount exposure, etc.) provided through a weather service application programming interface (API));

"D" is a dirt particle analysis value (for example, amounts or types of contaminants or surface adhesion or tenacity properties, etc.);

"A" is auto manufacturer specification data, such as paint formulas, colors, surface finish protective coatings as specified for the vehicle make and model; and "C" is vehicle geometry and surface structure attributes, as determined from modelled or matched manufacturer data bank profiles.

Embodiments optimize variables and settings utilized in implementing the vehicle washing system as a function of the functional algorithms described above, including:

to achieve efficiencies in consumption of water and washing solutions, which may be denoted by the expression "(detergent, dL/dt)";

to achieve efficiencies in total wash time values, which may be denoted by the expression "(duration washing solution is injected, t)"; and to achieve cost efficiencies, which may be denoted by the expression "(the degree of purification achieved by washing, Rc)," which is adjustable through (responsive to) variables or expressions including a type of solution "(formula of chemically, L)," concentration of the solution suitable for a more efficient wash ("% L"), and pressure wash and liquid flow "(distribution of pressure P, liquid and angle of injectors used for washing, I)."

Some embodiments determine surface roughness values (at 416, FIG. 4) for use in modifying the "A" specification values, or the "C" vehicle geometry and surface structure attribute values. In some embodiments, roughness measurement values are obtained using an optical sensor in combination with an application of lasers or other projected light. Thus, the value of variable "C" may be directly related to (determined from, modified by) a quality of paint or protective finish determined to be applied to the vehicle, or degraded from an expected state, including as defining or representing degrees of adhesion of metallic impurities on the surface of the vehicle. Thus, in response to determining surface roughness values, the Neuro Fuzzy Controller component 502 may revise (adjust, weight, etc.) the chemical composition or concentration "L" of washing solution selected by the Composition Calculator 506 or Solution Mix Calculator 508, or a minimum injection pressure "P" otherwise determined for the effective removal of impurities by the Injector Calculator 510 or the Washing Control System and Distributor 512.

Some embodiments of the Context Setting Profile Build component 504 analyze a degree of contamination of a surface using image recognition or processing subsystems (for example, at 402 of FIG. 4) and use this data in matching or generating vehicle profile detail data (at 406 or 408, FIG. 4), which is used by the Composition Calculator 506 or Solution Mix Calculator 508 to adjust the concentration of cleaning or rinsing solution ("% L"), and by the Injector Calculator 510 to set the injector pressure and washing time (P, t) for each injector as implemented by the Injector Distribution System 514 (for example, a time duration that the injector will be open and discharging during vehicle washing or rinsing).

Some embodiments determine a value or degree of contamination ("D(Rc)") as a function of identified and predicted contaminants, and their adhesion tenacity, deposit amounts, etc., that are estimated (weighted) as a function of the historic geographic travel and associated meteorological data, including via image data acquired by optical and laser scanning systems. The analysis of dirt particle samples acquired from vehicle surfaces may be analyzed via comparison to predefined models or profiles of known types of contamination that are derived using K-Means, near-neighbor clustering.

The calculations, determinations, revisions or weightings of variable values discussed above by the Neuro Fuzzy Controller component 502 are generally stored in memory devices or resources for use in improving the outputs via learning processes (at 422, FIG. 4) that are responsive to comparisons with stored data and feedback from previous operations and iterations. Thus, the Neuro Fuzzy Controller component 502 learns and improves effectiveness over time with regard to beneficial adjustments to vehicle wash system component attribute values.

Prior art vehicle wash systems generally automate vehicle wash settings in response to consideration of the size of the vehicle washed, as derived from images of the vehicle or other sensor data. In contrast, embodiments of the present invention define contaminant vehicle wash systems, processes and methods that customize vehicle wash settings and component and tool selection (for example, differentiating between low pressure or high pressure injector nozzle use) and washing and rinsing ingredients deployed, based on an analysis of the types of terrain and weather that the vehicle has traveled through (been exposed to) over a time period relevant to the vehicle (since a last wash, over a recent time period, etc.), as a function of identified/predicted contaminants to be washed off of the vehicle, and their adhesion tenacity, deposit amounts, etc., as estimated (weighted) as a function of the historic geographic travel and associated meteorological data.

Thus, the embodiments autonomously and differentially set the vehicle wash system attributes to provide different levels or features of applied vehicle washing (different soap or cleanings solutions, in different amounts, at different discharge pressures, over different times, at different rates of relative vehicle movement as driven by a vehicle conveyor system, etc.) in response to difference in weather or terrain experience by the travel of the different vehicles since a last vehicle wash, or over some other time frame. For example, the embodiments choose and implement different vehicle wash settings in response to determining recent travel over dirt roads versus over pavement; or in response to determining travel, a city that uses road salt to treat road surfaces during or after a recent snow storm indicated in considered weather data, versus through another city that uses sand instead, in response to differences in cleaning solutions indicated as most appropriate to remove road salt or sand contaminants.

What is claimed is:

1. A computer-implemented method, comprising executing on a computer processor:
    determining historical geographic travel data of a vehicle over a contaminant exposure time period that is inclusive of a present time;
    identifying a contaminant that is likely located on an external surface of the vehicle as a function of historic meteorological and terrain data of the historical geographic travel data of the vehicle over the contaminant exposure time period;
    selecting a cleaning solution that is appropriate for use in cleaning the identified contaminant from the external surface of the vehicle; and
    driving a vehicle wash system nozzle to use the selected cleaning solution to wash the identified contaminant from the external surface of the vehicle.

2. The method of claim 1, further comprising:
    determining an attribute of the identified contaminant as a function of historic meteorological and terrain data that is selected from the group consisting of a thickness of the identified contaminant disposed on the external surface, an amount of adherence of the identified contaminant to the external surface, and a tenacity of the identified contaminant disposed on the external surface;
    selecting a vehicle washing component setting in response to the determined attribute of the identified contaminant that is selected from the group consisting of a physical orientation of a washing nozzle relative to the external surface of the vehicle, an expelling pressure of a cleaning solution that conveyed onto the external surface of the vehicle by the washing nozzle, a temperature of the cleaning solution, a speed at which the vehicle is conveyed past the washing nozzle, and a total vehicle washing time; and
    driving the vehicle wash system nozzle to use the selected cleaning solution to wash the identified contaminant from the external surface of the vehicle as a function of the selected vehicle washing component setting.

3. The method of claim 2, further comprising:
    estimating an amount of surface roughness of the external surface of the vehicle as a function of the historic meteorological and terrain data; and
    selecting the vehicle washing component setting in response to the estimating an amount of surface roughness.

4. The method of claim 3, wherein the estimated an amount of surface roughness is selected from the group consisting of a level of oxidation of a painted surface of the external surface, a thickness of a protective finish deployed onto the external surface of the vehicle, and a level of degradation of the painted surface or the protective finish by an amount of sun exposure indicated by the historic meteorological and terrain data.

5. The method of claim 2, further comprising:
    revising, via a neuro fuzzy controller process, the selected vehicle washing component setting, to optimize a quality of performance of the vehicle washing system.

6. The method of claim 5, wherein the optimized quality of performance is selected from the group consisting of:
    decreasing an amount of washing solution used in washing the vehicle;
    revising the physical orientation of the washing nozzle relative to the external surface of the vehicle to reduce risk of damage to the external surface of the vehicle from conveying the vehicle past the nozzle;
    reducing the expelling pressure of the cleaning solution conveyed onto the external surface of the vehicle by the washing nozzle;
    reducing the temperature of the cleaning solution; and
    increasing the speed at which the vehicle is conveyed past the washing nozzle to reduce the total vehicle washing time.

7. The method of claim 5, further comprising:
    learning optimized values of the revisions to the selected vehicle washing component setting via the neuro fuzzy controller process in response to a vehicle wash quality feedback process input.

8. The method of claim 1, further comprising:
    integrating computer-readable program code into a computer system comprising a processor, a computer readable memory in circuit communication with the processor, and a computer readable storage medium in circuit communication with the processor; and
    wherein the processor executes program code instructions stored on the computer-readable storage medium via the computer readable memory and thereby performs the determining the historical geographic travel data of the vehicle over the contaminant exposure time period, the identifying the contaminant that is likely located on the external surface of the vehicle as the function of the historic meteorological and terrain data of the historical geographic travel data of the vehicle over the contaminant exposure time period, the selecting the cleaning solution, and the driving the vehicle wash system nozzle to use the selected cleaning solution to wash the identified contaminant from the external surface of the vehicle.

9. The method of claim 8, wherein the computer-readable program code is provided as a service in a cloud environment.

10. A system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:
    determines historical geographic travel data of a vehicle over a contaminant exposure time period that is inclusive of a present time;
    identifies a contaminant that is likely located on an external surface of the vehicle as a function of historic meteorological and terrain data of the historical geographic travel data of the vehicle over the contaminant exposure time period;
    selects a cleaning solution that is appropriate for use in cleaning the identified contaminant from the external surface of the vehicle; and drives a vehicle wash system nozzle to use the selected cleaning solution to wash the identified contaminant from the external surface of the vehicle.

11. The system of claim 10, wherein the processor executes the program instructions stored on the computer-readable storage medium via the computer readable memory and thereby:
determines an attribute of the identified contaminant as a function of historic meteorological and terrain data that is selected from the group consisting of a thickness of the identified contaminant disposed on the external surface, an amount of adherence of the identified contaminant to the external surface, and a tenacity of the identified contaminant disposed on the external surface;
selects a vehicle washing component setting in response to the determined attribute of the identified contaminant that is selected from the group consisting of a physical orientation of a washing nozzle relative to the external surface of the vehicle, an expelling pressure of a cleaning solution that conveyed onto the external surface of the vehicle by the washing nozzle, a temperature of the cleaning solution, a speed at which the vehicle is conveyed past the washing nozzle, and a total vehicle washing time; and
drives the vehicle wash system nozzle to use the selected cleaning solution to wash the identified contaminant from the external surface of the vehicle as a function of the selected vehicle washing component setting.

12. The system of claim 11, wherein the processor executes the program instructions stored on the computer-readable storage medium via the computer readable memory and thereby:
estimates an amount of surface roughness of the external surface of the vehicle as a function of the historic meteorological and terrain data; and
selects the vehicle washing component setting in response to the estimated amount of surface roughness.

13. The system of claim 12, wherein the estimated an amount of surface roughness is selected from the group consisting of a level of oxidation of a painted surface of the external surface, a thickness of a protective finish deployed onto the external surface of the vehicle, and a level of degradation of the painted surface or the protective finish by an amount of sun exposure indicated by the historic meteorological and terrain data.

14. The system of claim 11, wherein the processor executes the program instructions stored on the computer-readable storage medium via the computer readable memory and thereby revises via a neuro fuzzy controller process the selected vehicle washing component setting to optimize a quality of performance of the vehicle washing system.

15. The system of claim 14, further comprising:
learning optimized values of the revisions to the selected vehicle washing component setting via the neuro fuzzy controller process in response to a vehicle wash quality feedback process input; and
wherein the optimized quality of performance is selected from the group consisting of decreasing an amount of washing solution used in washing the vehicle, revising the physical orientation of the washing nozzle relative to the external surface of the vehicle to reduce risk of damage to the external surface of the vehicle from conveying the vehicle past the nozzle, reducing the expelling pressure of the cleaning solution conveyed onto the external surface of the vehicle by the washing nozzle, reducing the temperature of the cleaning solution, and increasing the speed at which the vehicle is conveyed past the washing nozzle to reduce the total vehicle washing time.

16. A computer program product for a smart vehicle washing apparatus, the computer program product comprising:
a non-transitory computer readable storage medium having computer readable program code embodied therewith, the computer readable program code comprising instructions for execution by a processor that cause the processor to:
determine historical geographic travel data of a vehicle over a contaminant exposure time period that is inclusive of a present time;
identify a contaminant that is likely located on an external surface of the vehicle as a function of historic meteorological and terrain data of the historical geographic travel data of the vehicle over the contaminant exposure time period;
select a cleaning solution that is appropriate for use in cleaning the identified contaminant from the external surface of the vehicle; and
drive a vehicle wash system nozzle to use the selected cleaning solution to wash the identified contaminant from the external surface of the vehicle.

17. The computer program product of claim 16, wherein the computer readable program code instructions for execution by the processor further cause the processor to:
determine an attribute of the identified contaminant as a function of historic meteorological and terrain data that is selected from the group consisting of a thickness of the identified contaminant disposed on the external surface, an amount of adherence of the identified contaminant to the external surface, and a tenacity of the identified contaminant disposed on the external surface;
select a vehicle washing component setting in response to the determined attribute of the identified contaminant that is selected from the group consisting of a physical orientation of a washing nozzle relative to the external surface of the vehicle, an expelling pressure of a cleaning solution that conveyed onto the external surface of the vehicle by the washing nozzle, a temperature of the cleaning solution, a speed at which the vehicle is conveyed past the washing nozzle, and a total vehicle washing time; and
drive the vehicle wash system nozzle to use the selected cleaning solution to wash the identified contaminant from the external surface of the vehicle as a function of the selected vehicle washing component setting.

18. The computer program product of claim 17, wherein the computer readable program code instructions for execution by the processor further cause the processor to:
estimate an amount of surface roughness of the external surface of the vehicle as a function of the historic meteorological and terrain data; and
select the vehicle washing component setting in response to the estimated amount of surface roughness.

19. The computer program product of claim 18, wherein the estimated an amount of surface roughness is selected from the group consisting of a level of oxidation of a painted surface of the external surface, a thickness of a protective finish deployed onto the external surface of the vehicle, and a level of degradation of the painted surface or the protective finish by an amount of sun exposure indicated by the historic meteorological and terrain data.

20. The computer program product of claim 17, wherein the computer readable program code instructions for execution by the processor further cause the processor to:
- revise via a neuro fuzzy controller process the selected vehicle washing component setting to optimize a quality of performance of the vehicle washing system; and
- learn optimized values of the revisions to the selected vehicle washing component setting via the neuro fuzzy controller process in response to a vehicle wash quality feedback process input; and
- wherein the optimized quality of performance is selected from the group consisting of decreasing an amount of washing solution used in washing the vehicle, revising the physical orientation of the washing nozzle relative to the external surface of the vehicle to reduce risk of damage to the external surface of the vehicle from conveying the vehicle past the nozzle, reducing the expelling pressure of the cleaning solution conveyed onto the external surface of the vehicle by the washing nozzle, reducing the temperature of the cleaning solution, and increasing the speed at which the vehicle is conveyed past the washing nozzle to reduce the total vehicle washing time.

* * * * *